Figure 1:
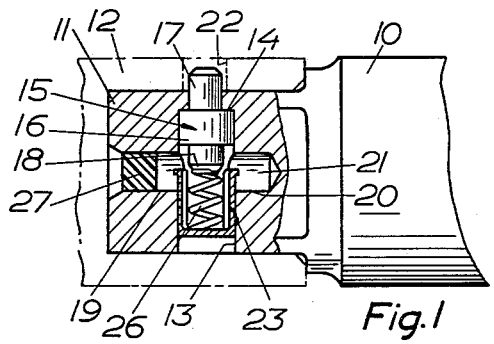

Jan. 21, 1964  C. V. RESARE  3,118,696
SOCKET RETAINERS
Filed Dec. 28, 1960

INVENTOR.
Conny Valter Resare
BY
his Attorney 3,118,696
SOCKET RETAINERS
Conny Valter Resare, Enskede, Sweden, assignor to Atlas Copco Aktiebolag, Nacka, Sweden, a corporation of Sweden
Filed Dec. 28, 1960, Ser. No. 79,048
4 Claims. (Cl. 287—119)

This invention relates generally to separable connections between driving and driven elements such, for example, as the customary polygonal socket connections of rotary tools. More particularly, the invention relates to socket retainers for retaining a socket element separably on the end portion of a driving socket retaining member.

One object of the invention is to provide a novel and improved releasable socket retaining means especially for use together with rotary impact tools and having a long operable life.

Another object of the invention is to provide a socket retaining means embodying simple constructional features and incorporating a minimum of parts together with an efficient inter-arrangement of these parts for keeping them assembled and in working order under the most severe conditions including fatigue and repeated shock from impact.

A further object of the invention is to provide a retaining means of the foregoing character which is rapidly and easily exchangeable.

A still further object of the invention is to provide a socket retaining means which is efficiently protected and enclosed against dirt and excess grease.

The above and still further objects of the invention will become obvious from the following description and from the accompanying drawing in which two embodiments of the invention are illustrated by way of example. It should be understood that these embodiments are only illustrative and various modifications of the invention may be made within the scope of the claims without departing from the scope of the invention.

Figure 6:
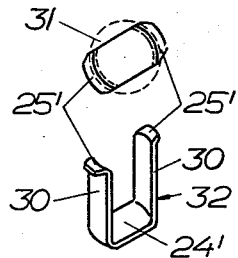
Figure 2:
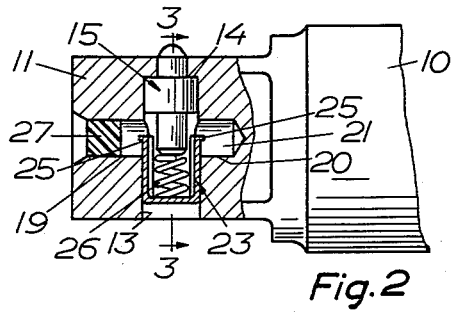
Figure 3:
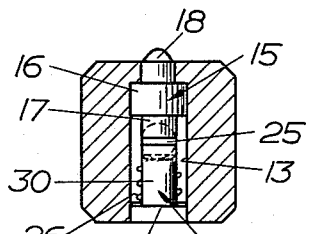
Figure 4:
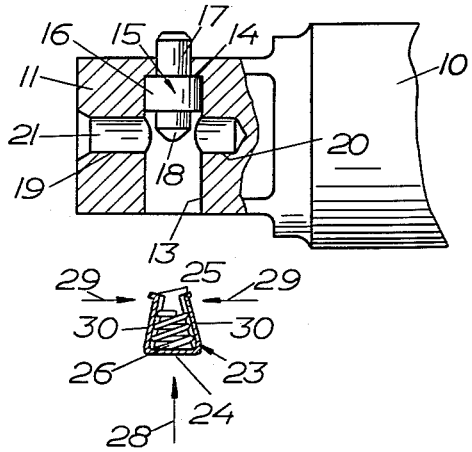
Figure 5:
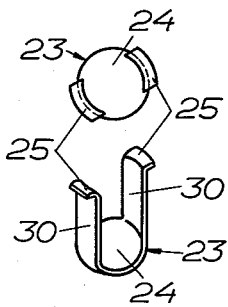

In the drawing in which similar reference characters refer to similar parts,

FIG. 1 is a longitudinal fragmentary section through a spindle end embodying the features of the invention, FIG. 2 is a view similar to FIG. 1 but showing the latching detent of FIG. 1 turned through an angle of 180°, FIG. 3 is a cross section through the spindle end taken along the line 3—3 of FIG. 2, FIG. 4 is a view similar to FIG. 1 but showing schematically the assembly of the spring clip of FIG. 1, FIG. 5 shows enlarged perspective and top views of the spring clip of FIG. 1, and FIG. 6 shows enlarged perspective and top views of a modified type of spring clip.

Referring to the drawings there is shown a rotatable spindle 10 which, for example, may be the anvil of a power driven impact tool (not shown). On the spindle there is formed a polygonal end portion 11, for example a square end, which is adapted to receive the usual type of socket 12 as shown in chain-dotted lines in FIG. 1. The square 11 of the spindle 10 is provided with a transverse hole 13 opening into opposed side surfaces of said square. Adjacent one end of the hole 13 there is a constriction forming an inner shoulder 14. A detent 15 is movably arranged in the hole 13 and consists of a central cylindrical part 16 having a reduced cylindrical end 17 and an opposite reduced end with a frusto-conical or rounded tip 18. The detent 15 may be inserted in the hole 13 with alternatively the end 17 or the tip 18 facing the shoulder 14, and when the central cylindrical part 16 of the detent 15 is brought against the shoulder 14 the reduced cylindrical part 17 or the frusto-conical tip 18 will protrude through the constriction. The protruding end of the detent 15 cooperates with a hole 22 in the socket 12 in order to retain the socket 12. The rounded or frusto-conical tip 18 is used for making possible rapid attachment and detachment of the socket 12 from the square 11 with the help of the camming action of the tip surface against the edge of the hole 22 in the socket 12. The cylindrical end 17 is used when frequent changes of the socket are unnecessary or a more positive lock for the socket is desired requiring for release a full depression of the detent 15.

In the hole 13 there are arranged transverse circular abutments 19 and 20 which may be formed for example by the oppositely disposed parts of a longitudinal hole 21 intersecting the hole 13.

A generally U-shaped spring clip 23, FIG. 5, having a flat base 24 and laterally projecting bends or hooks 25 on the free ends of its shanks 30 is inserted in the hole 13 and engages with said hooks 25 the transverse cylindrical abutments 19 and 20 adjacent the hole 13 by which engagement with the spring clip is kept against displacement in the hole 13. The configuration of the base 24 is identical with the cross-sectional shape of the hole 13.

Interposed between and seated against the base 24 of the spring clip 23 and the detent 15 there is a helical spring 26 which urges the detent 15 against the shoulder 14 to project its end 17 or 18 outwardly. The spring 26 is slightly conical, converging in the direction of the detent 15.

In assembling the socket retaining parts the detent 15 is first inserted into the hole 13 with the reduced end 17 or 18 protruding through the constriction. Thereafter the spring 26 is placed in the spring clip 23 with its wider end against the base or spring seat 24. After axial compression of the spring 26 in the direction of the spring seat 24, the shanks of the spring clip 23 are compressed towards each other in the direction of the arrows 29, as depicted in FIG. 4. This keeps the spring in place and compressed inside of the shanks 30 of the spring clip 23. The compression in the direction of the arrows 29 may be performed manually or with the help of some suitable instrument, for example by means of pincers. With the spring 26 compressed, the taper of the spring 26 is great enough to allow compression of the shanks to an extent permitting the insertion of the hooks 25 of the spring clip 23 into the mouth of the hole 13. Thereafter the shanks of the spring clip 23 are released and the clip is pushed deeper into the hole 13 in the direction of the arrow 28 with the hooks 25 gliding along the walls of the hole 13 until they, by reason of the resiliency of the shanks 30 of the clip, are latched outwardly and engage the respective cylindrical abutments 19 and 20. The outward latching movement of the shanks releases the spring 26 to contact the detent 15 and to constantly urge said detent against the shoulder 14. The operation of the detent to act as a separable connection between the square end 11 and the socket 12 is well known in the art and evident from the foregoing description.

Owing to the base 24 of the spring clip 23 acting as a closure for the hole 13 and with a plastic sealing plug 27 frictionally inserted in the longitudinal bore 21, the hollow parts of the square 11 together with the spring 26 are efficiently protected against dirt and excess grease.

As an alternative the longitudinal bore 21 may be omitted and replaced by a circumferential groove formed in the walls of the hole 13 about midway between the ends of said hole and forming the necessary abutments for the hooks of the spring clip.

The spring clip 23 may be bent or die-drawn from a sheet metal strip, or made from sheet metal by drawing in a suitable die a circular flat blank to cup shape incorporating a flattened circumferential rim, cutting out two or more shanks from the wall of the cup, and hardening and annealing the cut cup in order to get the desired springiness. The multiple shank alternative is suited for use together with the circumferential groove mentioned above.

In FIG. 6 there is shown a modified spring clip, which is especially suited for easy dismantling of the retainer. The clip 32 is similar to the clip 23 in FIG. 5 but has a base 24¹ in the form of a strip with parallel edges and bends or hooks 25¹ with rounded or cam-shaped corners. In use a washer 31, which tightly fits into the hole 13, may be interposed between the base 24¹ and the conical spring 26 in order to insure tightness against the walls of the hole 13. When dismantling the retainer the clip 32 is seized for example with the help of pincers which can readily grip the side edges of the base 24¹ whereupon the clip 32 is turned through 90°. During this turning motion the hooks 25¹ are cammed out of engagement with the circular abutments 19, 20 and are brought into engagement with the walls of the hole 13, whereupon the clip 32 may be removed axially from the hole 13. After removal of the clip the detent 15 may be shifted to protrude with its other end through the constriction adjacent the shoulder 14, whereupon the clip 2 is re-inserted together with the spring 26.

The embodiments of the invention above described and illustrated in the drawing should only be considered as examples and the invention may be modified in several different ways within the scope of the following claims.

What I claim is:

1. In apparatus of the character described for retaining a socket element on the spindle of a power driven impact tool or the like and having an end portion for receiving said socket element with a transverse hole disposed centrally therein, the combination which comprises a longitudinal passage disposed centrally in said end portion and intersecting said hole at substantially right angles, shoulders disposed in said hole at one end thereof, a solid detent slidable in said hole having a wide central portion for engaging said shoulders and with an end thereof protruding from said hole when said central portion engages said shoulders, resilient means disposed in said hole and against said detent on the side thereof away from said shoulders, holding means disposed in said hole against said resilient means on the side thereof away from said detent for urging said resilient means toward said detent and being deformable for insertion into said hole whereby said holding means engages abutments formed by said longitudinal passage for holding said resilient means against displacement, said resilient means and said holding means being disposed substantially entirely on the opposite side of the axis of said longitudinal passage from said detent.

2. In apparatus of the character described for retaining a socket element on the spindle of a power driven impact tool or the like and having an end portion for receiving said socket element with a transverse hole disposed centrally therein, the combination which comprises a longitudinal passage disposed centrally in said end portion and intersecting said hole at substantially right angles, shoulders disposed in said hole at one end thereof, a solid detent slidable in said hole and disposed to protrude from said hole, a tapered spring disposed in said hole and against the opposite end of said detent, retaining means disposed in said hole around said spring on the side thereof away from said detent for urging said spring against said detent, said retaining means being deformable for insertion into said hole whereby the said retaining means engages abutments formed by said longitudinal passage for holding said spring against displacement, and said spring and retaining means being disposed substantially entirely on the opposite side of said longitudinal passage from said detent.

3. In apparatus of the character described for retaining a socket element on the spindle of a power driven impact tool or the like and having an end portion for receiving said socket element with a transverse hole disposed centrally therein the combination which comprises a longitudinal passage disposed centrally in said end portion and intersecting said hole at substantially right angles, the combination which comprises shoulders disposed in said hole at one end thereof, a solid detent slidable in said hole and having a wide central portion for engaging said shoulders with an end thereof protruding from said hole when said central portion engages said shoulders, resilient means disposed in said hole and against said detent on the end thereof away from said shoulders, a holder disposed in said hole against said resilient means on the side thereof away from said detent, said holder having a base forming a seat for said resilient means for holding said resilient means against displacement and being deformable for insertion into said hole whereby the said holder engages abutments formed by said longitudinal passage for holding said resilient means against displacement, and said resilient means and said holder being disposed substantially entirely on the opposite side of said longitudinal passage from said detent.

4. In apparatus of the character described for retaining a socket element on the spindle of a power driven impact tool or the like and having an end portion for receiving said socket element with a transverse hole disposed centrally therein, the combination which comprises a longitudinal passage disposed centrally therein and intersecting said transverse hole at substantially right angles, shoulders disposed in said holes at one end thereof, a solid detent slidable in said hole and having means for engaging said shoulders with an end of said detent protruding from said hole, a tapered spring disposed in said hole and against said detent on the opposite end thereof, a holder disposed in said hole against said spring on the side thereof away from said detent, said holder having a base forming a seat for said spring and resilient legs with hooks thereon extending from said seat, said legs being deformable for insertion of said holder into said hole whereby the said hooks thereon engage abutments formed by said central longitudinal passage for holding said spring against displacement, and said spring and holder being disposed substantially entirely on the opposite side of said longitudinal passage from said detent.

References Cited in the file of this patent

UNITED STATES PATENTS

| | | |
|---|---|---|
| 1,890,822 | Murray | Dec. 13, 1932 |
| 2,474,360 | Jimerson | June 28, 1949 |
| 2,529,219 | Kost | Nov. 7, 1950 |
| 2,620,209 | Flora | Dec. 2, 1952 |